(12) United States Patent
Christen et al.

(10) Patent No.: US 6,405,528 B1
(45) Date of Patent: Jun. 18, 2002

(54) METHOD FOR DETERMINING LOAD ON PARTICULATE FILTER FOR ENGINE EXHAUST, INCLUDING ESTIMATION OF ASH CONTENT

(75) Inventors: Urs Christen; Brendan Patrick Carberry, both of Aachen (DE); Paul Eduard Moraal, Vaals (NL)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/716,650

(22) Filed: Nov. 20, 2000

(51) Int. Cl.$^7$ .................................................. F01N 3/00
(52) U.S. Cl. ............................ 60/295; 60/274; 60/277; 60/311
(58) Field of Search .......................... 60/274, 277, 286, 60/297, 311, 303, 295; 502/304

(56) References Cited

U.S. PATENT DOCUMENTS

| | | | | |
|---|---|---|---|---|
| 4,603,550 A | * | 8/1986 | Shinzawa | 60/274 |
| 4,711,087 A | * | 12/1987 | Kawamura | 60/286 |
| 4,835,963 A | * | 6/1989 | Hardy | 60/274 |
| 5,195,316 A | * | 3/1993 | Shinzawa et al. | 60/274 |
| 5,287,698 A | * | 2/1994 | Shinzawa et al. | 60/286 |
| 5,319,930 A | * | 6/1994 | Shinzawa et al. | 60/286 |
| 5,489,319 A | * | 2/1996 | Tokuda et al. | 60/311 |
| 6,013,599 A | * | 1/2000 | Manson | 502/340 |

FOREIGN PATENT DOCUMENTS

DE  99 11 366.7-2311  8/1999

* cited by examiner

Primary Examiner—Thomas Denion
Assistant Examiner—Tu M. Nguyen
(74) Attorney, Agent, or Firm—Carlos Hanze

(57) ABSTRACT

A method for determining the load on an internal combustion engine exhaust particulate filter optimizes filter regeneration by determining the portion of the filter load constituted by accumulated ash. In one technique, the ash load is determined by recording the lowest value of DPF load over a time or distance interval. In another technique, an estimate is made of the amount of load remaining at each of a plurality of DPF regeneration events; the amount of remaining load immediately following the regeneration event corresponds to the amount of accumulated ash in the DPF. DPF load estimation is performed using equations for laminar or turbulent flow in pipes. These equations establish a linear or quadratic relationship between the flow through the DPF and the pressure drop measured across it.

9 Claims, 1 Drawing Sheet

METHOD FOR DETERMINING LOAD ON PARTICULATE FILTER FOR ENGINE EXHAUST, INCLUDING ESTIMATION OF ASH CONTENT

FIELD OF THE INVENTION

The present invention broadly relates to methods for estimating the load on an engine exhaust gas particulate filter resulting from the accumulation of particulate matter, and deals more particularly with an improved method for determining the load that includes an estimation of the ash content in the filter.

BACKGROUND OF THE INVENTION

Particulate filters are used in the exhaust systems of internal combustion engines, especially diesel engines, (diesel particulate filters or DPF) to trap and remove particulate matter which is primarily formed of carbon based material. As the engine exhaust passes through the DPF, the particulates are trapped in the filter and accumulate over time. This leads to an increase in the resistance of the exhaust gas flow through the DPF, and therefore, to an increase in the backpressure on the engine. This increase in backpressure has an adverse effect on engine operation, and especially on fuel consumption. In order to reduce backpressure to acceptable levels, the DPF is periodically regenerated by burning off the accumulated particulates, most of which are combustible.

The DPF should be regenerated sparingly, however, for a number of reasons. First, the filtering efficiency of the DPF increases with increased particulate loading. Second, in order to achieve regeneration, the exhaust gas temperature must be elevated to above that achieved during normal engine operation, consequently regeneration results in higher fuel consumption. Third, regeneration is most effective when the particulate loading is sufficiently high and homogenous throughout the filter.

There are a number of conventional methods that may be used to increase the exhaust gas temperature to the requisite level (e.g. above 450° C.) in order to initiate a regeneration event. Regardless of the method used to increase exhaust gas temperature, it is necessary to estimate the load on the DPF so that regeneration events are initiated at optimal intervals. The DPF load may be inferred from reference values that depend on engine operating conditions, or it can be measured more directly by sensing the exhaust pressure upstream and downstream of the DPF and solving an equation describing the relationship between the mass flow through the DPF and the sensed pressures. The effective restriction used in this equation establishes the dependence on the load accumulated in the DPF. By first solving the equation for the effective restriction and then solving the equation describing the effective restriction for the load, the load of the DPF can be estimated.

Known techniques for estimating DPF load do not take into consideration the accumulation of inert particulate matter in the DPF, such as ash. Ash adds to the backpressure experienced by the engine and to the pressure drop across the DPF, although it does not endanger the DPF during regeneration since it does not contribute to the exothermic reaction that occurs during the regeneration process. It would be highly desirable to distinguish between the amount of ash accumulated in the DPF, and the load represented by the carbon particulates accumulated in the DPF. The present invention is directed towards satisfying this need.

SUMMARY OF THE INVENTION

The present invention provides an improved method for determining the load on a (DPF) which includes estimating the amount of the load attributable to inert material, such as ash.

According to one aspect of the invention, the amount of inert material accumulated in the DPF is determined by detecting the end of a DPF regeneration event and then determining the existing DPF load which is assumed to be produced by inert particulates. The end point of the regeneration event may be determined by sensing the temperature of the exhaust gas flowing through the filter or by determining the rate of change of the DPF load. The remaining load in the DPF representing inert material may be determined by sensing the pressure drop across the DPF, immediately following the end of the regeneration event. Preferably, the backpressure load in the DPF is measured over a number of regeneration events, and the inert particulate load is taken as the smallest load value determined after all of these regeneration events.

According to another aspect of the invention, a method is provided to estimate the amount of inert particulate load in a DPF, comprising determining the total DPF load over a pre-selected time or distance interval and selecting the smallest load value as being that attributable to the inert particulate load. The method is preferably formed by storing only two time/load or distance/load pairs in order to avoid the need for storing the entire set of DPF load data over the full pre-selected time or distance interval.

In accordance with the preferred embodiment, of the invention, the DPF load is estimated using equations describing laminar or turbulent flows in pipes that represent the relationship between the mass flow through the DPF and the pressure drop across it.

Accordingly, it is a primary object of the present invention to provide an improved method for determining the load on a DPF.

Another object of the invention is to provide a method as described above which estimates that portion of the DPF load that is created by inert particulates in the DPF, such as ash.

A further object of the invention is to provide a method as described above that determines the DPF load by sensing the pressure drop across the DPF and then solving equations that describe the laminar or turbulent flow through the DPF.

These, and further objects and advantages of the invention will be made clear or will become apparent during the course of the following description of a preferred embodiment of the invention.

DETAILED DESCRIPTION OF THE PREFERRED EMBODIMENT

Figure 1:
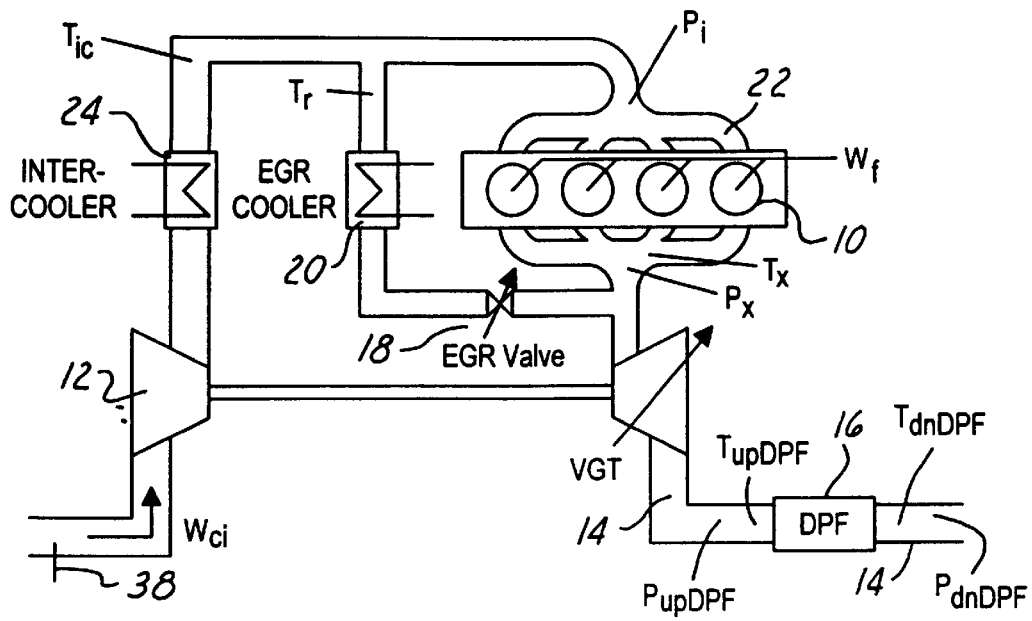
FIG. 1 is a diagrammatic view of a turbo-charged diesel engine and related exhaust system containing a DPF.

Referring first to FIG. 1, a diesel engine 10 is equipped with a turbo-charger 12 having an exhaust line 14 provided with an in-line diesel particulate filter 16 (DPF). The DPF 16 is operable to filter and thereby remove particulate matter carried in the exhaust gas produced by the engine 10. A portion of the exhaust gas is re-circulated to the engine's intake manifold 22 through an optional EGR valve 18 and an EGR cooler 20. An innercooler 24 is provided between the turbo-charger 12 and the intake manifold 22. Numerous temperature and pressure parameters shown in FIG. 1 are sensed by corresponding sensors that are used in the control strategy for the engine 10 and to optimize the regeneration intervals of the DPF 16. It should be noted here that although the invention is described herein in connection with a diesel engine, the inventive method may also be advantageously used with other types of engines, such as, for example, a direct injection gas engine.

Figure 2:
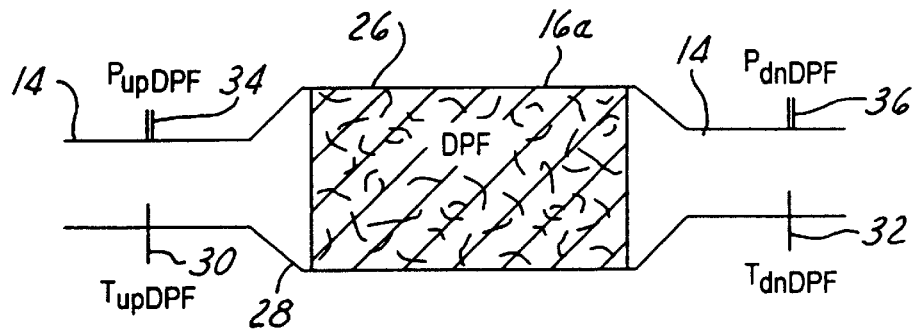
FIG. 2 is a simplified, longitudinal sectional view of one form of the DPF shown in FIG. 1.

One form of the DPF shown in FIG. 2, designated by the numeral 16a includes a filter 26 housed within an outer cylindrical tube 28 having tapered ends that are connected in-line with the exhaust line 14. In order to monitor the DPF 16 and its loading, the temperature of the exhaust gas upstream and downstream of the DPF 16 is measured by a pair of temperature sensors 30, 32 which produce corresponding temperature signals $T_{upDPF}$, $T_{dnDPF}$. Similarly the pressure of the exhaust gas upstream and downstream is measured by a pair of corresponding pressure sensors 34, 36 that are positioned in the exhaust line 14, respectively upstream and downstream of the DPF 16 and produce corresponding pressure signals $P_{upCat}$, $P_{dnDPF}$. The use of the two pressure sensors 34, 36 permits the determination of the differential pressure therebetween, designated as $\Delta P_{measured}$. Also necessary in order to monitor the DPF 16 and its loading, a mass air flow (MAF) sensor 38 is provided which produces a mass air flow signal $W_{ci}$.

Figure 3:
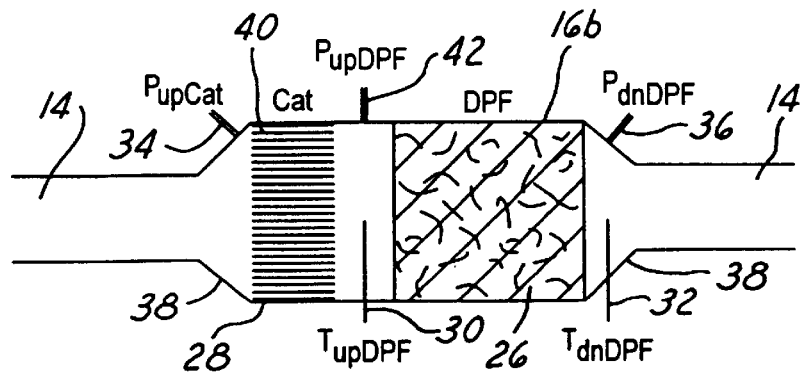
FIG. 3 is a view similar to FIG. 2 but showing an alternate form of the DPF.

An alternate form of the DPF designated by the numeral 16b is shown in FIG. 3, wherein an oxidation catalyst 40 is positioned within the DPF housing 28 upstream and spaced from the DPF 26. In this embodiment, sensors 34, 36 and 32 are disposed in the tapered portions 38 of the DPF 16b, rather than in the exhaust line 14. Moreover, temperature sensor 30 is positioned within a gap between the filter 26 and the catalyst 40, so as to sense the temperature of the gas after it passes through the catalyst 40 but before it reaches the DPF 26. An additional pressure sensor 42 is also disposed in the gap between the catalyst 40 and the DPF 26 in order to determine the pressure $P_{upDPF}$, however, it should be noted that this sensor can be eliminated if the pressure drop across the catalyst 40 is calculated.

The use of the temperature, pressure and air mass flow sensors described above permit a determination of the DPF load. This determination is based on the functional relationship between the DPF load and the effective area of the DPF, and the use of experimentally established calibration factors applied in combination with a valve equation for the non-critical flow regime for the mass flow of exhaust gas through the DPF 16. The effect of the DPF load on the flow through the exhaust pipe 14 can be modeled as a valve which is slowly closing as the load increases. This valve equation, which describes flow through an orifice, is well known in the art, and describes the mass flow by $$W_{DPF}=[A(l_{DPF})P_{upDPF}/(RT_{upDPF})^{1/2}]\times\{(2\gamma/\gamma-1)[(P_{dnDPF}/P_{upDPF})^{2/\gamma}-(P_{dnDPF}/P_{upDPF})^{(\gamma+1)/\gamma}]\}^{1/2}$$

Where A is the effective area, modeled as a function of the DPF carbon loading; R is the gas constant; $\gamma$ the ratio of specific heat constants; and the pressures and temperatures are as introduced above. At steady-state engine operation, the flow through the DPF, $W_{DPF}$ is given as the sum of mass air flow, $W_{cp}$, and fuel flow, $W_f$, which both are known. The above equation can then be solved for $A(l_{DPF})$:

$$A(l_{DPF})=[(W_{ci}+W_f)/P_{upDPF}](RT_{upDPF})^{1/2}\times\{(2\gamma/\gamma-1)[(P_{dnDPF}/P_{upDPF})^{2/\gamma}-(P_{dnDPF}/P_{upDPF})^{(\gamma+1)/\gamma}]\}^{-1/2}$$

The effective area $A(l_{DPF})$ can be modeled as an exponential function of the loading, $L_{DPF}$, or as a first or second order polynomial. For all three functions, the coefficients are readily determined experimentally. All of these functions can be easily solved for the loading such that an explicit reading of the DPF loading in (g/l) is obtained.

A more detailed explanation of the DPF load estimation using the above orifice equation to model the flow through the DPF is described in European Patent application 99 11 366.7–2311 entitled "Method to Determine The Amount of Diesel Particulant Accumulated in a DPF", the entirety of which is incorporated by reference herein.

In contrast to the method for determining the DPF load utilizing the orifice equation mentioned above, and depending upon the geometry of the DPF and its sensors, it may be more effective to use equations describing laminar or turbulent flows in pipes to represent the relationship between the mass flow through the DPF 16 and the pressure drop across it. As will be described below, equations are derived to establish a linear or quadratic relationship between the flow through the DPF 16 and the pressure drop across it. For purposes of deriving the equations for laminar or turbulent flows, the following notations will be used:

| | | |
|---|---|---|
| $A_{dpf}$ | — | effective restriction |
| $C_0, C_1, C_2, C_3$ | | coefficients |
| d | m | diameter |
| $f_{DPF}()$ | | function relating the volumetric flow and the pressure drop |
| L | m | Length |
| $l_{DPF}$ | g/l | DPF load |
| $l_{DPF,ash}$ | g/l | ash load in the DPF |
| $l_{DPF,carbon}$ | g/l | carbon load in the DPF |
| $l_{DPF,filtered}$ | g/l | DPF load after passing a low-pass filter |
| $P_{dnDPF}$ | kPa | pressure downstream of the DPF |
| $P_{DPF}$ | kPa | pressure in the DPF |
| $P_{upDPF}$ | kPa | pressure upstream of the DPF |
| R | kJ/kg/K | gas constant |
| T | K | temperature |
| $t_{ash}$ | s | time interval used for the detection of ash accumulated in the DPF |
| $T_{dnPF}$ | K | temperature downstream of the DPF |
| $T_{DPF}$ | K | temperature in the DPF |
| $T_{upDPF}$ | K | temperature upstream of the DPF |
| V | m3/s | volumetric flow |
| $V_{DPF}$ | m3/s | volumetric flow through the DPF |
| W | kg/s | mass flow |
| $W_{DPF}$ | kg/s | mass flow through the DPF |
| $\Delta p$ | kPa | pressure drop |
| $\Delta p_{DPF}$ | kPa | pressure drop across the DPF |
| $\eta$ | Ns/m² | Viscosity |
| $\rho$ | kg/m³ | Density |

For laminar flow, the Hagen-Poiseuille equation relates the volumetric flow V through a pipe to the pressure drop $\Delta p$:

$$V = \Delta p \prod \frac{d^4}{128\eta L} \quad (1)$$

where d is the diameter of the pipe, L is its length, and $\eta$ the viscosity of the fluid. Hence, the pressure drop is a linear function of the flow (assuming $\eta$ to be constant):

$$\Delta p = c_1 V. \quad (2)$$

If the Reynolds number associated with a flow through a pipe is above 2320, the flow is no longer laminar but turbulent. For turbulent flow, the pressure drop depends quadratically on the volumetric flow:

$$\Delta p = c_2 V^2 \quad (3)$$

with the coefficient depending on the Reynolds number and the roughness of the walls.

Diesel particulate filters consist of not just one tube but of a very large number of parallel tubes, and the flow must pass through the walls between the tubes which are open toward the engine and those open to the exhaust pipe. To account for all these phenomena we combine equations (2) and (3):

$$\Delta p = c_o + c_1 V + c_2 V^2 \quad (4)$$

In order to keep the remaining derivation general, the function $f_{DPF}(V)$ is introduced to represent the right-hand side of any of the equations (2), (3), or (4). Hence, $$\Delta p_{DPF} = P_{upDPF} - P_{dnDPF} = f_{DPF}(V_{DPF}) \quad (5)$$

The coefficients in the expression (2), (3), or (4) have to be calibrated with flow measurements on a DPF loaded to a known loading level ("nominal load"). With the density $$\rho = \frac{p}{RT} \quad (6)$$

where R is the gas constant, T the temperature, and p the pressure, the volumetric flow can be replaced by the mass flow W:

$$V = \frac{RT}{p} W \quad (7)$$

This is a valid approximation because pressure and temperature do not change much along the DPF.

In order to account for the clogging by particulate matter which gradually accumulates in the DPF, an effective restriction $A_{DPF}$ is introduced. $A_{DPF}(l_{DPF})$ is a function of the DPF load $l_{DPF}$; $A_{DPF}$ is normalized in the sense that for the nominally loaded DPF, it is equal to one, and larger than one for a DPF loaded further. An exponential function can be used for $A_{DPF}$:

$$A_{DPF}(l_{DPF}) = \exp(-c_3 l_{DPF}) \quad (8)$$

or any other expression which can readily be solved for $l_{DPF}$ such as a polynomial of first or second order.

With the effective restriction and equation (7), the expression (4) for the pressure drop becomes:

$$\Delta p_{DPF} = A_{DPF}(l_{DPF}) \frac{f_{DPF}(RT_{DPF} W_{DPF})}{P_{DPF}} \quad (9)$$

This equation can be solved for the effective restriction:

$$A_{DPF}(l_{DPF}) = \frac{\Delta p_{DPF}}{\frac{f_{DPF}(RT_{DPF} W_{DPF})}{P_{DPF}}} \quad (10)$$

which itself can be solved for the DPF load:

$$l_{DPF} = -1/c_3 \ln\{A_{DPF}(l_{DPF})\} \quad (11)$$

The temperature $T_{DPF}$ used for the conversion from volumetric to mass flow can either be the temperature $T_{upDPF}$ upstream of the DPF, the temperature $T_{dnDPF}$ downstream, or the average of these two temperatures, depending on which sensors are available. As long as no regeneration of the DPF takes place, $T_{upDPF}$ and $T_{dnDPF}$ should be about the same. The same can be said for the absolute pressure $P_{DPF}$. However, since the pressure drop $\Delta P_{DPF}$ is measured (for accuracy reasons), $P_{DPF}$ should be computed in one of the following ways:

$$P_{DPF} = P_{upDPF} - \frac{\Delta p_{DPF}}{2}$$

$$P_{DPF} = P_{dnDPF} + \frac{\Delta p_{DPF}}{2}$$

Alternatively, the pressure $P_{dnDPF}$ downstream of the DPF may be estimated based on the flow $W_{DPF}$ and the temperature $T_{dnDPF}$.

The DPF load signal estimated with equation (11) can be post processed by using a slow lowpass filter which is only updated if either the mass flow through the DPF or the pressure drop across it exceeds a certain threshold.

As previously discussed, the DPF 16 is regenerated by periodically increasing the temperature of the exhaust gas to a level that is sufficient to burn combustible particulates that have accumulated in the DPF. Typically these combustible particulates comprise carbon. However, in addition to trapping the carbon particulates, the DPF traps engine debris, oil and fuel additives as well. Although most of the particulate matter is converted to gaseous species during the regeneration process, and thus are removed from the DPF there is some portion which is inert and cannot be burned. This unburned material remains in the DPF in the form of ash. The ash trapped in the DPF accumulates over time and contributes to the pressure drop across the DPF, even though it is not part of the carbon particulate load, i.e. the load that is available to contribute to the exothermic reaction during the DPF regeneration process.

In order to accurately determine the true DPF load, i.e. that portion of the total load that can be removed through combustion during regeneration, it is necessary to determine the amount of ash that has accumulated in the DPF. According to one technique of the present invention, the end-point of a regeneration event is detected and a determination is made of the DPF load at that time. The remaining DPF load following the end-point of the regeneration event is taken to be ash. Each regeneration of the DPF is not necessarily always complete. In other words, the level of regeneration of the DPF may vary from event to event. Accordingly, it is preferred that the estimate of the ash load obtained in the manner described above is filtered over several regeneration events. When estimating the load after successive regeneration events, it is particularly important to detect the exact end of the regeneration event. This can be accomplished by first detecting the regeneration itself. Regeneration is determined by sensing the temperature of the DPF inlet. An exothermic reaction is revealed by an energy imbalance, or the slope of the filtered DPF load signal going negative. When the exothermic reaction is complete or the slope of the DPF load starts to become positive again, it can be assumed that the regeneration event is over and that the remaining DPF load is ash.

According to another technique of the present invention, which is not directly sensitive to the detection of regeneration events, the smallest value of the DPF load is recorded over a time interval $t_{ash}$, e.g. 50 hours of engine operation, and the smallest value of the DPF load detected during that interval is taken to be the amount of accumulated ash. It should be noted here however, that it may be more convenient to measure the interval in terms of distance traveled by the vehicle, instead of time. In order to avoid having to store the entire DPF load signal for the full time interval $t_{ash}$, the method of the present invention preferably uses only two stored time/load pairs. One suitable algorithm for carrying out this ash load estimation technique is shown below:

```
%Initialize
If keep-alive memory has been reset
    t1=0, ash_t1=0% smallest value over the past
        % t_ash interval
    t2=0, ash_t2=inf % smallest value over the past
        % t_ash/2 interval
else
    % use same values as stored in keep-alive memory
    % before turning the engine off
end
% at run time
if ash_t2>l_DPF_filtered
    ash_t2=l_DPF_filtered
    t2=t % time stamp
    if ash_t2<ash_t1
        ash_t1=ash_t2
        t1=t2
end
and
if (t-t2>t_ash/2) or (t-t1>t_ash)
    ash_t1=ash_t2
    t1=t2
    ash_t2=inf
    t2=t
end
% estimated ash
l_DPF_ash=ash_t1
```

The amount of ash stored in ash_t2 (minimum value over the past $t_{ash}/2$ interval) is compared to the current value of the filtered DPF load $l_{DPF,filtered}$. If $l_{DPF,filtered}$ is smaller, the stored value is updated and the current value of the engine operating hours is stored in t2. If the new value is smaller than the value stored in ash_t1 (minimum value over the full $t_{ash}$ interval), it is updated as well. If the value stored in ash_t2 has not been changed for a period exceeding $t_{ash}/2$ or the one in ash_t1 for a period exceeding $t_{ash}$, the old small value in ash_t1 is replaced by the new, larger value from ash_t2. The estimated amount of ash trapped, $l_{DPF,ash}$ is given by the value stored in ash_t1, i.e. the lower value of the two.

The value of the carbon load accumulated in the DPF then is computed as:

$$l_{DPF,carbon} = l_{DPF,filtered} - l_{DPF,ash}$$

From the foregoing, it may be appreciated that the method described above not only provides for the reliable accomplishment of the objects of the invention but does so in a particularly effective and economical manner. It is recognized that those skilled in the art may make various modifications or additions chosen to illustrate the invention without departing from the spirit or scope of the present contribution to the art. Accordingly, it is to be understood that the protection sought and to be afforded hereby should be deemed to extend to the subject matter claimed and all equivalents thereof fairly within the scope of the invention.

What is claimed is:

1. A method of estimating the amount of inert, incombustible material accumulated in a particulate filter for an internal combustion engine exhaust, comprising the steps of:

(A) repeatedly measuring the backpressure load in said filter over a preselected interval, said backpressure load resulting from the trapping and accumulation of both combustible and said inert materials in said filter, the amount of said backpressure load varying over time in part as a result of said filter being periodically regenerated; and (B) determining the smallest backpressure load measured in step (A) over said interval, said smallest determined backpressure load being related to said accumulated amount of inert material.

2. The method of claim 1, wherein step (B) includes:

storing at least certain of the loads measured in step (A) in a memory, and updating said memory each time a load measured in step (A) is lower than the load currently stored in said memory, whereby said memory maintains storage of the lowest value of the load determined in step (A) during said interval.

3. The method of claim 2, including the step of recording the time during said each time said memory is updated.

4. A method of estimating the amount of inert material accumulated in a particulate filter for an internal combustion engine exhaust, comprising the steps of:

(A) regenerating said filter by increasing the temperature of exhaust gas entering said filter to a level sufficient to incinerate combustible particulates trapped in said filter and representing a backpressure load;

(B) detecting the end point of step (A);

(C) after completing step (B), determining the remaining load in said particulate filter, said remaining load being related to the accumulated amount of said inert material in said filter;

(D) successively repeating steps (A)–(C); and (E) determining the minimum amount of remaining load determined over the successively repeated steps.

5. The method of claim 4, wherein step (B) is performed by sensing a change in temperature of the exhaust gas flowing through said filter.

6. The method of claim 4, wherein step (C) is performed by measuring the pressure drop across said filter after said endpoint has been detected in step (B).

7. The method of claim 4, wherein step (B) is performed by determining the rate of change of said measured backpressure load.

8. A method of determining the load in a particulate filter for an internal combustion engine resulting from the accumulation of incombustible particulates in said filter over a preselected interval, wherein the total load in said filter includes both said incombustible and combustible particulates, comprising the steps of:

(A) determining the value of the load in said filter at a first time point during said preselected interval;

(B) storing the value determined in step (A) in a memory;

(C) determining the value of said load in said filter at each of a plurality of time points during said subsequent to said first time point;

(D) comparing the values determined in step (C) with the value stored in step (B); and (E) updating said memory based on the comparison performed in step (D) when the comparison performed in step (D) indicates that the value of the load determined at a subsequent time point is less than the previously stored load value, the value stored in said memory at the end of said interval representing said incombustible particulate load.

9. The method of claim 8, including the step of storing the value of an engine running time each time said memory is updated.

* * * * *